(12) United States Patent
Ruotsalainen et al.

(10) Patent No.: US 8,072,509 B2
(45) Date of Patent: Dec. 6, 2011

(54) METHOD AND A SYSTEM FOR IMAGE PROCESSING, A DEVICE, AND AN IMAGE RECORD

(75) Inventors: Petteri Ruotsalainen, Toijala (FI); Taisto Heinonen, Lempäälä (FI)

(73) Assignee: Nokia Corporation, Espoo (FI)

( * ) Notice: Subject to any disclaimer, the term of this patent is extended or adjusted under 35 U.S.C. 154(b) by 1278 days.

(21) Appl. No.: 10/865,495

(22) Filed: Jun. 9, 2004

(65) Prior Publication Data
US 2005/0050102 A1  Mar. 3, 2005

(30) Foreign Application Priority Data
Jun. 11, 2003 (FI) ...................................... 20035091

(51) Int. Cl.
*H04N 5/76* (2006.01)
*H04N 5/222* (2006.01)
*H04W 68/00* (2009.01)
*H04W 4/00* (2009.01)

(52) U.S. Cl. ............... 348/231.3; 348/333.1; 348/231.2; 455/460; 455/461

(58) Field of Classification Search .......... 348/345–357, 348/196, 367; 396/77, 96; 455/460, 461
See application file for complete search history.

(56) References Cited

U.S. PATENT DOCUMENTS

| | | | |
|---|---|---|---|
| 5,528,293 A | | 6/1996 | Watanabe |
| 5,724,579 A * | | 3/1998 | Suzuki ........................ 707/104.1 |
| 5,903,309 A * | | 5/1999 | Anderson ................ 348/333.02 |
| 6,084,951 A * | | 7/2000 | Smith et al. ................ 379/93.17 |
| 6,389,124 B1 * | | 5/2002 | Schnarel et al. ......... 379/142.01 |
| 6,469,689 B1 * | | 10/2002 | Dow et al. ...................... 345/156 |
| 6,556,243 B1 | | 4/2003 | Dotsubo et al. ............. 348/231.2 |
| 6,621,524 B1 * | | 9/2003 | Iijima et al. .................... 348/584 |
| 6,888,569 B2 * | | 5/2005 | Fox et al. ....................... 348/239 |
| 6,987,535 B1 * | | 1/2006 | Matsugu et al. .............. 348/239 |
| 7,046,994 B1 * | | 5/2006 | Padawer et al. ............... 455/415 |
| 7,209,571 B2 * | | 4/2007 | Davis et al. .................... 382/100 |
| 7,221,395 B2 * | | 5/2007 | Kinjo ............................. 348/239 |
| 7,325,029 B1 * | | 1/2008 | Chang .......................... 709/203 |

(Continued)

FOREIGN PATENT DOCUMENTS
EP     0 907 098 A1   4/1999
(Continued)

OTHER PUBLICATIONS

Jane Radatz, "The IEEE Standard Dictionary of Electrical and Electronics Terms", Apr. 8, 1997, Institute of Electrical and Electronics Engineers, Inc., Sixth Edition, p. 1151.*

(Continued)

*Primary Examiner* — Sinh Tran
*Assistant Examiner* — Christopher K Peterson

(57) ABSTRACT

The present invention relates to a method for image processing, wherein image data is stored as an image record in digital format. The image record is provided with at least a header part (201), an image data part (202) and an auxiliary data part (203). In the method, at least one defining data record (204) containing auxiliary data is stored in connection with the data record (200), wherein in connection with the processing of the image data, it is selected whether said at least one item of image data is displayed in connection with displaying the image. The invention also relates to a system and a device (1) in which the invention is applied, as well as to an image record (200).

18 Claims, 6 Drawing Sheets

U.S. PATENT DOCUMENTS

| | | | |
|---|---|---|---|
| 2002/0001395 A1* | 1/2002 | Davis et al. | 382/100 |
| 2002/0021902 A1 | 2/2002 | Hosoda et al. | |
| 2003/0160878 A1 | 8/2003 | Nagao | 348/231.3 |
| 2004/0012811 A1* | 1/2004 | Nakayama | 358/1.15 |

FOREIGN PATENT DOCUMENTS

| | | |
|---|---|---|
| EP | 0907098 A1 | 4/1999 |
| EP | 1220530 | 7/2002 |
| EP | 1220530 A2 | 7/2002 |
| EP | 1322109 | 6/2003 |
| EP | 1322109 A2 | 6/2003 |
| EP | 1351187 | 10/2003 |
| EP | 1351187 A2 | 10/2003 |
| JP | 6-217252 | 8/1994 |
| JP | 11-327031 | 11/1999 |
| JP | 2000-222503 | 8/2000 |
| JP | 2002-300513 | 10/2002 |
| WO | 01/95609 A1 | 12/2001 |
| WO | 0195609 | 12/2001 |
| WO | 02091741 | 11/2002 |

OTHER PUBLICATIONS

E. Hamilton: JPEG File Interchange Format Version 1.02, Sep. 1, 1992, C-Cube Microsystems, retreived on Sep. 20, 2004 from the Internet: http://www.dcs.ed.ac.uk/home/mxr/gfx/2d/JPEG.txt.

European Patent Office Communication pursuant to Article 96(2) EPC for EP Application No. 04736211.6-2202 for Applicant: Nokia Corporation; Jul. 7, 2006.

European Patent Office Communication for EP Application No. 04736211.6-2202 for Applicant: Nokia Corporation; Aug. 4, 2006.

Canadian Office Action dated May 27, 2008 issued in corresponding Canadian Patent Application No. 2,528,327 (3 pages).

English translation of Japanese Office Action dated Oct. 21, 2008, 4 pages.

Partial translation of JP 6-217252 (Abstract and paragraph [0033] and Fig. 5); Publication No. JP6217252, Publication Date: Aug. 5, 2004, 3 pages.

Partial translation of JP 2002-300513 (Abstract and paragraphs [0072]-[0074] and Figs. 11 and 12); Publication No. JP2002300513, Publication Date: Oct. 11, 2002, 4 pages.

Partial translation of JP11327031 (Abstract and paragraphs [0020]-[0021] and Figs. 2 and 3); Publication No. JP11327031, Publication Date: Nov. 26, 1999, 4 pages.

Japanese Office Action for corresponding application No. 2006-516242 dated Aug. 4, 2009, original Office Action (2 pages), English translation of Office Action (4 pages), 6 pages total.

Patent Abstracts of Japan, Publication No. 2000-222503, Date of publication: Aug. 11, 2000, 1 page.

Machine translation of JP2000-222503, 23 pages.

* cited by examiner 304　302　　　　　　　　303　304

METHOD AND A SYSTEM FOR IMAGE PROCESSING, A DEVICE, AND AN IMAGE RECORD

CROSS-REFERENCE TO RELATED APPLICATIONS

This application claims priority under 35 USC §119 to Finnish Patent Application No. 20035091 filed on Jun. 11, 2003.

FIELD OF THE INVENTION

The present invention relates to a method for image processing, in which image data is recorded in digital format as an image record, and the image record is provided with at least a header part, an image data part, and an auxiliary data part. The invention also relates to an image processing system which comprises means for recording an image in digital format as an image record which comprises at least a header part, an image data part, and an auxiliary data part, and means for processing the image record. Furthermore, the invention relates to a device with means for processing a digital image and recording it as an image record which comprises at least a header part, an image data part, and an auxiliary data part, and means for processing the image record. Moreover, the invention relates to an image record in which image data is recorded in digital format, and the image record is provided with at least a header part, an image data part, and an auxiliary data part.

BACKGROUND OF THE INVENTION

In digital cameras, video cameras, scanners, image recorders, and other devices for processing images in electronic format, an optical image is converted to electronic format by means of an image sensor, such as a CCD (charge coupled device) sensor or a CMOS sensor. Such an image sensor consists of several photosensitive picture elements which are preferably arranged in the form of a matrix. The number of picture elements in the image sensors affects the quality (resolution) of the image. Each picture element is subjected to a charge or another electrical quantity which is proportional to the quantity of light to which it is exposed and which can be measured. After the exposure to light, e.g. a mechanical shutter is used to prevent the access of light in the image sensor. The shutter function can also be implemented electrically by reading the image sensor sufficiently quickly, or by using, as the shutter, e.g. a liquid crystal display or another screen whose translucency can be electrically controlled.

The conversion of the analog signal generated by the image sensor to digital format can be made by an analog-to-digital converter. The accuracy of the analog-to-digital conversion is typically 8 bits, whereby each picture element yields 256 levels of luminous intensity. Considering the properties of the human eye, this number is normally sufficient to achieve the required image quality. From the analog-to-digital converter, this conversion result is transferred in parallel format to further processing steps, such as for recording in an image memory or on a videotape.

For the recording of images in digital format, several recording formats have been developed. These normally comprise a header part and an image data part. The header part normally comprises information about the image recording format, compression which the image may have been subjected to, the resolution, etc. One known image recording standard is the EXIF (Exchangeable Image File Format), which is applied e.g. in digital cameras by several manufacturers. According to this standard, the header part of the image record is used for recording, for example, data relating to the image size, the resolution, the time of recording, and the standard version. In compressed images, the header is normally also used for storing, for example, the information needed for decompression, such as a dequantizing table and a decompression table.

In many cameras, it is possible to determine auxiliary data to be recorded in the image, such as the time of capturing the image (date and possibly also the time). Furthermore, in some cameras, the user can determine a free-form text to be recorded on the image. This auxiliary data can then be seen in connection with the rest of the image data when the images are viewed later on. This arrangement has, for example, the drawback that the auxiliary information cannot be made invisible in the image but it is always displayed. If the user wants an image of an object where the auxiliary information is not visible, the user must then capture one image without the auxiliary information and another image with the auxiliary information. This is cumbersome and unnecessarily consumes the image memory of the camera. Moreover, the images taken of the same object one after the other are not necessarily fully identical. For example, such an arrangement is not suitable for capturing an object which is moving or changing in another way. Furthermore, the user may also want images with different auxiliary information. For example, the date is displayed in one image, text defined by the user is displayed in another image, and all the auxiliary information is displayed in a third image. When arrangements of prior art are used, this requires that the user takes several images and separately selects the auxiliary information to be included in each image, which makes the recording slower, consumes the memory capacity of the camera, and causes extra trouble for the user of the camera. To include desired auxiliary information in an image according to an image format, it is also possible to use image processing software. Also in this case, the user must process several image files. If standard image formats are not used, it is possible to use application-specific file formats, wherein it may be sufficient to process a single file. In such a situation, however, one must use the exact file format of the application in question. Examples of such applications include Photoshop® (trademark of Systems Inc.) and Powerpoint® (trademark of Microsoft Inc.).

SUMMARY OF THE INVENTION

It is an aim of the present invention to provide an improved image processing method, in which auxiliary data included in the image can be selected to be visible or invisible at the time of displaying. Furthermore, if the auxiliary data includes several parts, it is possible to select the part or parts to be displayed in the image at the time. The invention is based on the idea that the auxiliary data is recorded separately from the image, wherein in the situation of displaying the image it is possible to select to display or not to display the auxiliary data, or a part of it, in the image. To put it more precisely, the method according to the present invention is primarily characterized in storing at least one defining record including auxiliary data in connection with the image record, wherein in connection with the processing of the image data it is selected whether said at least one item of auxiliary data is displayed in connection with displaying the image. The system according to the present invention is primarily characterized in that the system comprises means for storing at least one defining record including auxiliary data in connection with the image record, and selecting means for selecting the stored at least one item of auxiliary data to be displayed in connection with the displaying of the image, when necessary. The device according to the present invention is primarily characterized in that the device comprises means for storing at least one defining record including auxiliary data in connection with the image record, and selecting means for selecting the stored at least one item of auxiliary data to be displayed in connection with the displaying of the image, when necessary. The image record according to the present invention is primarily characterized in that the image record comprises at least one defining record including auxiliary data stored in connection with the image record, wherein in connection with the processing of the image data it is arranged to be selected whether said at least one item of auxiliary data is displayed in connection with displaying the image.

The present invention shows remarkable advantages over solutions of prior art. By the method according to the invention, the image can be provided with stored auxiliary data which can be displayed or left hidden in connection with displaying the image. Thus, the user does not need to capture several images of the same object only to be prepared to show the image either with or without the auxiliary data. Thus, the capturing of images is easier and faster, and on the other hand, the user does not need to remember to capture images not containing auxiliary data. The arrangement of the invention is also useful in the imaging of objects which are moving or changing in another way, and when displaying the images, it is possible to select, according to the need, whether or not to display the auxiliary data recorded in the images. Another advantage of the method according to the invention is, for example, that the images of the method are compatible with images of prior art in such a way that a device which does not have the facility to process auxiliary data according to the invention can still be used to view the images in the format in which they were stored, although the auxiliary data cannot be processed (e.g. added or deleted).

DESCRIPTION OF THE DRAWINGS

In the following, the invention will be described in more detail with reference to the appended drawings, in which.

DETAILED DESCRIPTION OF THE INVENTION

Figure 1:
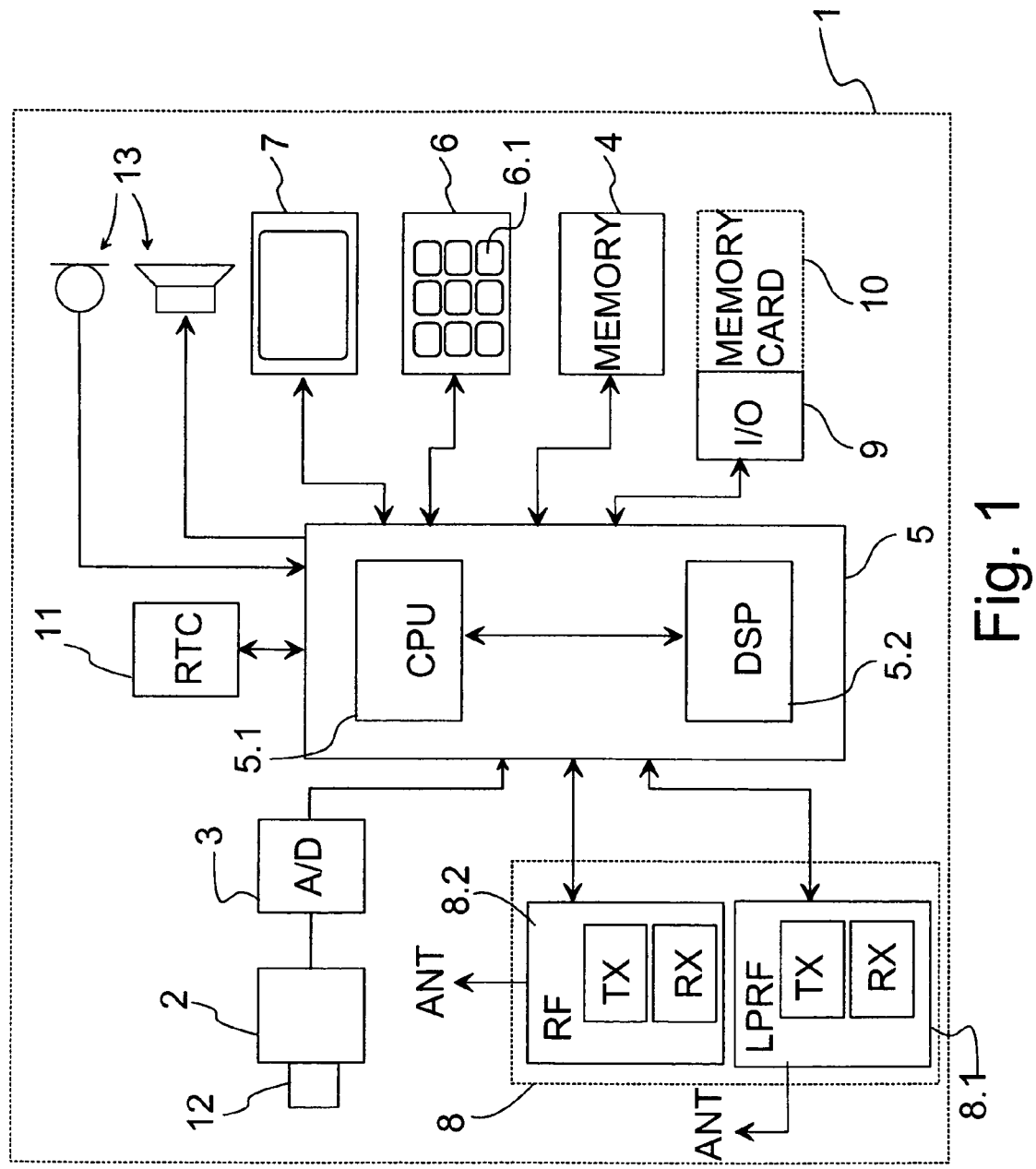
FIG. 1 shows a device according to a preferred embodiment of the invention in a simplified block diagram.

FIG. 1 shows a device 1 according to an advantageous embodiment of the invention. The device 1 is, for example, a camera or a wireless communication device, but it will be obvious that the invention is not limited to such devices only. The device 1 comprises image capturing means 2, such as a CCD cell or a CMOS cell. The image capturing means 2 preferably comprise picture elements (not shown) which are arranged in the form of a matrix and which preferably generate electrical data, such as a charge, proportional to the intensity of light to which the picture element is exposed. This electrical data is read from the picture elements and converted to digital format by an analog-to-digital converter 3. Consequently, the image capturing means 2 are used as a photoelectrical converter. The digital image data is stored in a memory 4 for further processing. For the capturing of color images, the image capturing means 2 normally comprise three picture elements for each pixel to be formed. Thus, each of these three picture elements are used to form the information of one color. These colors are normally red, green and blue (RGB). Consequently, each pixel consists of three color information elements.

The device 1 of FIG. 1 also comprises a control block 5 for controlling the functions of the device 1. The control block 5 preferably comprises at least a processor 5.1 (central processing unit, CPU) and possibly also a digital signal processor 5.2 (DSP). The device 1 also comprises input means 6 needed for using the device, such as operating keys or a keypad. Also, the device 1 may comprise a display 7 for displaying information, such as a captured image or the view of the viewfinder, to the user.

In some applications, the image 1 comprises communication means 8 for data transmission between the device 1 and another device (not shown). The communication means 8 may comprise, for example, local communication means 8.1 for short-range data transmission, and telecommunication means 8.2, such as mobile communication means, for data transmission of longer distances. The local communication means 8.1 can be used, for example, for transferring images from the device 1 to another device, such as a computer, in the vicinity.

The device 1 may also comprise connecting means 9 for connecting, for example, a memory card 10 for storing images. Thus, images to be captured by the device 1 can be recorded in the internal memory 4 of the device 1 and/or on the memory card 10.

In addition, the device 1 preferably comprises a real time clock 11 for maintaining time data and date data to be used as auxiliary data in connection with the images as will be discussed below in this description. Furthermore, the device 1 of FIG. 1 comprises audio means 13.

The following is a description of the operation of the method according to a preferred embodiment of the invention in a device 1 as shown in FIG. 1. To capture an image, the user directs an objective 12 to an object to be imaged. The device 1 may be equipped with a conventional optical viewfinder, or the image capturing means 2 can be used as the finder. If data generated by the image capturing means 2 is used as the finder in the device 1, the image data is transferred to be displayed on the display 7. In this case, the image displayed on the display 7 is updated at intervals. At the stage when the user wants to capture an image, he/she pushes a trigger key 6.1. Thus, the keystroke is detected in the control block 5, and the measures required for recording the image are taken. The control block 5 transfers a command to capture the image to the image capturing means 2. Thus, the image capturing means 2 transfer the charges of the picture elements row by row, column by column, or picture element by picture element, for example, to transfer registers. The way of transferring the charges in practice depends, for example, on the technique of implementing the image conversion means. This is prior art known by anyone skilled in the art, wherein it is not necessary to describe it in more detail in this context.

The electrical data generated by each picture element is converted to a digital value in the analog-to-digital converter 3 and is recorded in the memory 4. The memory 4 is preferably provided with a memory space with one storage location for each picture element, wherein the converted value is stored in the location reserved for it in the memory. The device 1 may also comprise several analog-to-digital converters 3, wherein several conversions can be made substantially simultaneously. For example, with three converters, it is possible to perform the conversions of all the color components of a single pixel, which are stored in the memory locations intended for the different color components of said pixel.

Figure 2A:
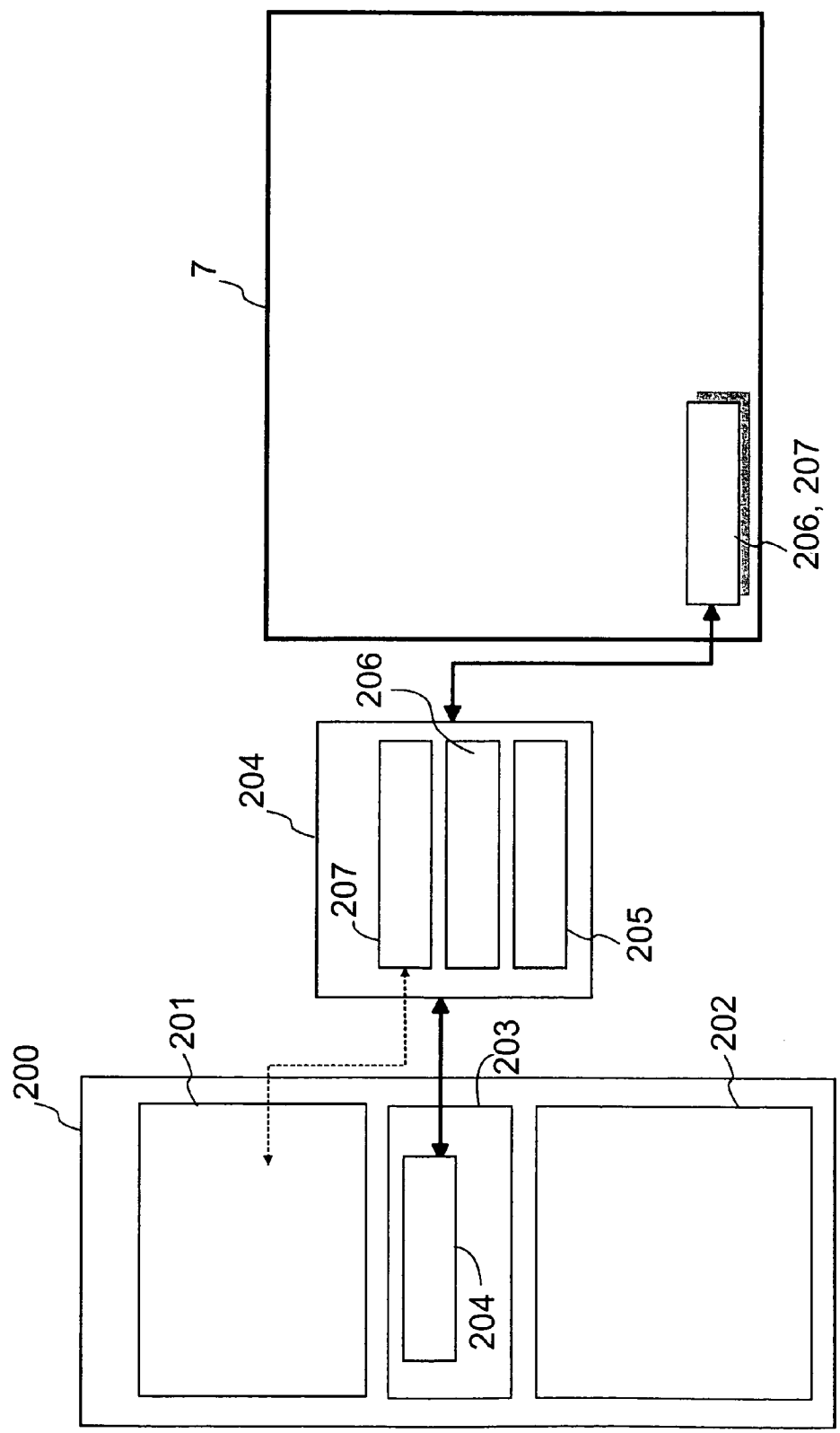
FIG. 2a shows the structure of an image record according to a preferred embodiment of the invention in a simplified manner.

After the electrical charges of all the picture elements in the image area have been converted to digital format and stored, it is possible to form an image record. This is done preferably by forming a file whose structure primarily complies with a given format. FIG. 2a shows, in a simplified manner, the structure of an image record 200 according to an advantageous embodiment of the invention. It comprises a header part 201, an image data part 202, and an auxiliary data part 203. The auxiliary data part is a logical element which is known in different image record formats. The auxiliary data part 203 may comprise e.g. EXIF fields. The auxiliary data part 203 can be used for storing information relating to the image, such as date and time, image resolution, data about the format of the image (e.g. RGB, YUV), whether it is a color image or a black-and-white image, data about the compression of the image data, etc. The image data part 202 is used for storing digitized values of the picture elements either as such or in a form compressed by a compression method. In the system according to the present invention, auxiliary data is preferably also stored in defining data records 204 formed in the auxiliary data part 203 in connection with the images. The user can thus select if this auxiliary data is displayed in the image or not.

In the example of the image record of FIG. 2a, the defining data records 204 in the auxiliary data part are intended for each item of auxiliary data defined in the image record. These defining data records 204 comprise at least an area definition 205 comprising stored data about the area available for displaying auxiliary data in the image. The area 205 is preferably rectangular, wherein the area definition indicates e.g. the coordinates of the corner points limiting the area, or the coordinates of a given corner (e.g. the upper left corner) together with the width and length of the area. In addition to the area definition, each defining data record 204 comprises at least a first auxiliary data field 206 for storing the image data of the area in a situation in which the auxiliary data is not displayed (i.e. the auxiliary data is not activated). Furthermore, the defining data record 204 comprises a second auxiliary data field 207 comprising data about auxiliary data to be displayed (i.e., the auxiliary data is activated). This can be data already in pixel format (bitmap), wherein the contents of the second auxiliary data field 207 can be copied directly to the image location complying with the area definition in a situation in which said auxiliary data is displayed. The contents of the second auxiliary data field 207 can also be in text format, or it may refer to some auxiliary data in the data record, for example the date and/or time of storing the image record. Yet another possibility is that the information complying with the definitions of the second auxiliary data field 207 is displayed on top of the first auxiliary data field 206. In this case, the first auxiliary data field defines a kind of a background image, on top of which the data of the second auxiliary data field 207 is placed.

The above-presented first 206 and second 207 auxiliary data fields define a way of displaying auxiliary data in two modes, wherein the application software displaying image records on the display 7 selects either the first auxiliary data field 206 or the second auxiliary data field 207 to be displayed, according to whether said auxiliary data is to be displayed or not.

Figure 3A:
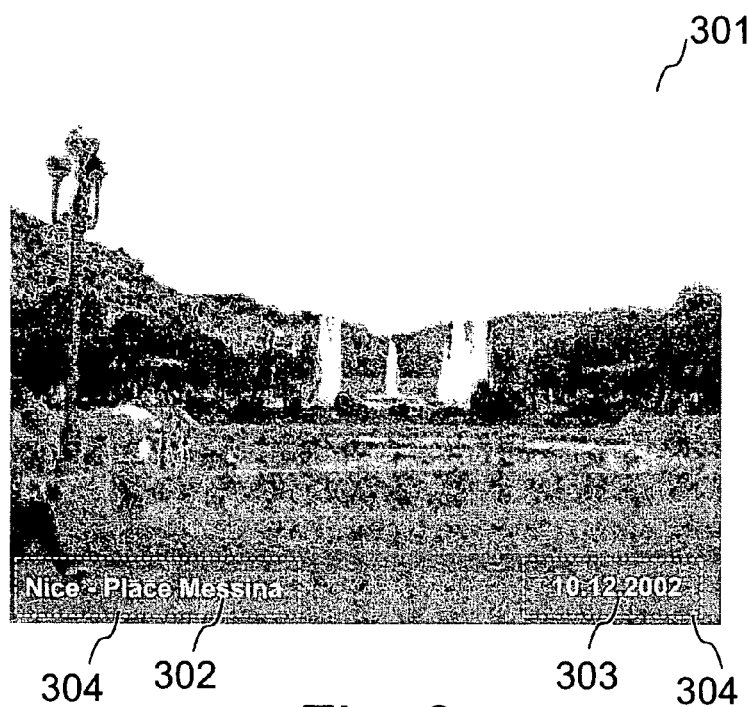
FIGS. 3a and 3b show an example of an image in which the invention is applied.
Figure 3B:
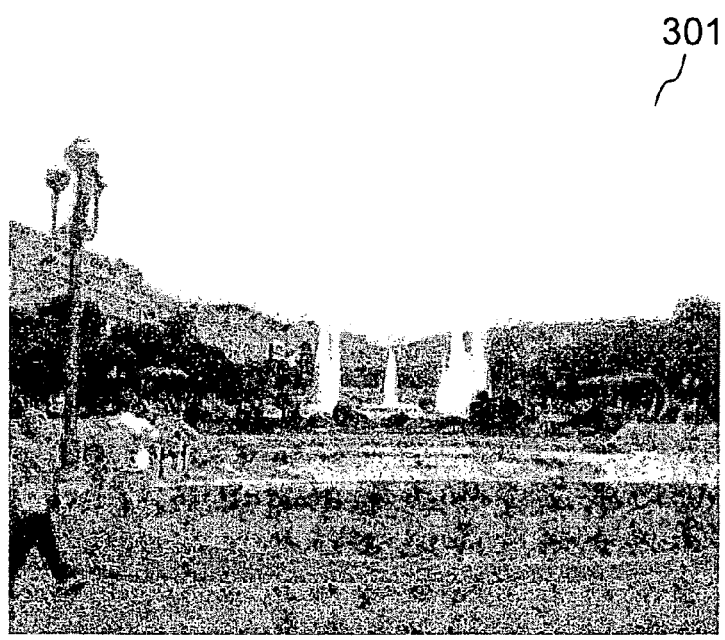

In the following, we shall describe the formation of auxiliary data to be applied in the method according to an advantageous embodiment of the invention, in the example of FIGS. 3a and 3b. FIG. 3a shows an image 301 recorded by the device 1. The user can define free-format information 302 to be included in the image. This free-format information 302 is, for example, a text. The user can enter this free-format information 302, for example, by input means 6, wherein the text is stored in the second auxiliary data field 207. The location of displaying the free-format information is, depending on the application in question, either fixed or it can be selected either freely within the area of the image or by selecting one of alternative locations. As already stated above, this location is preferably defined as an area, such as a rectangular element, within whose limits the auxiliary data is to be displayed at will. This area is indicated by dotted lines 304 in FIG. 3a. FIG. 3a also shows second auxiliary data 303, which in this example is the date. Also, the location of this second auxiliary data 303 can be fixed or selected by the user. The device 1 is used to store a defining data record in the auxiliary data part 303 of the image record, containing the auxiliary data and the data about its location displayed in the image. When such auxiliary data is defined, that part of image data which falls within the area definition for the auxiliary data is also stored in the first auxiliary data field 206. In practice, this is performed by copying the image data from the part of the memory limited by the area 304 into the first auxiliary data field 206.

According to an advantageous embodiment of the invention, at the stage when the image is to be displayed in the device 1 or in another device, the following steps are taken. The header part of the image record is examined to find out the type of the image. If the image is e.g. compressed, it is decompressed to restore the image corresponding to the original image as accurately as possible by means of the compressed information and possibly tables relating to the compression. This image data is transferred to a memory location allocated for the image data in the memory 4 of the device 1. In addition, it is determined if the auxiliary data part 303 of the image record comprises a defining data record or records 204 for auxiliary data. If at least one defining data record 204 is found, its content is examined. Also, the user may be asked if the auxiliary data is to be displayed or not. On the other hand, this displaying data may also be stored in the defining data record 204. If the data included in the defining data record 204 is displayed on the display 7, e.g. the location for displaying the auxiliary data and the auxiliary data fields 206, 207 are determined from the defining data record 204. Thus, the image data in either the first 206 or the second auxiliary data field, i.e. the part of the original image complying with the area definition 205, is copied in the location corresponding to the displaying location in the memory 4 of the device 1. Furthermore, the information in the second auxiliary data field 207, i.e. the free-format information, date, time, or the like, is copied in the respective location. On the other hand, this auxiliary data cannot necessarily be copied in the image in the form it is in the image record, wherein the required conversion must be made to display the auxiliary data in an intelligible format on the display 7. For example, if the date has been stored in the so-called ASCII format, in which one character of the date is stored as one byte (8 bits), this data must be converted e.g. to a matrix-format pixel mask in which the pixel conversions required for visualizing the character are taken into account. Thus, the image pixels complying with the pixel mask are set to have a given color to represent the symbol to be displayed (e.g. number or letter) to distinguish them from the rest of the image. In the example of FIG. 3a, black pixels have been used for displaying the auxiliary data, but also another color can be used.

If the image is to be displayed without the auxiliary data, the image is displayed normally by reading the image record in the memory and taking the necessary decompression steps, and if the image has been stored so that the auxiliary data is visible, by transferring the image data of the first auxiliary data field 206 to the location defined by the area definition 205 in the image. In FIG. 3b, the example image 301 of FIG. 3a is displayed without the auxiliary data 303, 304.

If, when displaying the image, one or more items of auxiliary data are to be cleared (from the display 7), the whole image does not necessarily have to be re-read in the memory but, for example, the following steps can be taken. The image data according to the first auxiliary data field 206 is read from the auxiliary data part of the image record of the image to be displayed, into the memory 4. On the display, the content of this image data corresponds to the original image data in the area where the auxiliary data to be cleared has been shown, i.e. that part of the image which is within the area definition of the auxiliary data part. After this, the image to be displayed corresponds to the original image in the area of the deleted auxiliary data. FIG. 3b shows a situation in which both items 302, 303 of auxiliary data have been cleared from the image 3a.

Figure 4A:
FIGS. 4a and 4b show another example of an image in which the invention is applied.
Figure 4B:
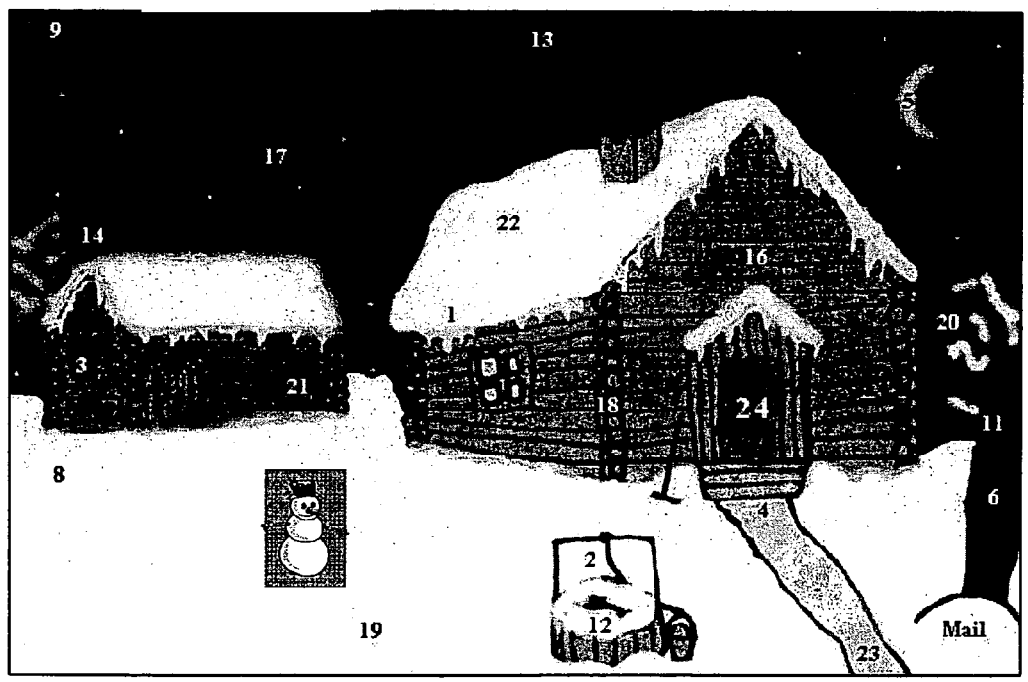

According to the method of the invention, it is possible to implement different types of image records with varying contents. One nonrestrictive example to be mentioned is a Christmas calendar application shown in FIGS. 4a and 4b. Thus, the image data part 202 of the image record comprises a background image. Preferably 24 doors to be opened, i.e. from December 1 to December 24, have been defined in this background image. These doors have been implemented by means of defining data records 204 attached to the auxiliary data parts 203 according to the invention. Thus, each door is a separate auxiliary data part comprising a first 206 and a second 207 auxiliary data field. The first auxiliary data field 206 contains the image data corresponding to a situation in which the door is closed. Thus, the content of the first auxiliary data field 206 corresponds to the content of the background image at the door. FIG. 4a shows a situation in which all the doors are closed. Furthermore, the first auxiliary data field 206 comprises a number (1 to 24) and possibly also the border line of the door. The second auxiliary data field 207 comprises the image data to be shown when the door is opened. An example of this is door #15 opened in FIG. 4b. Furthermore, each defining data record comprises data indicating whether the door is closed or open. The doors can be opened, for example, automatically by means of calendar functions, or the user can open the doors by using the input means 6.

Figure 2B:
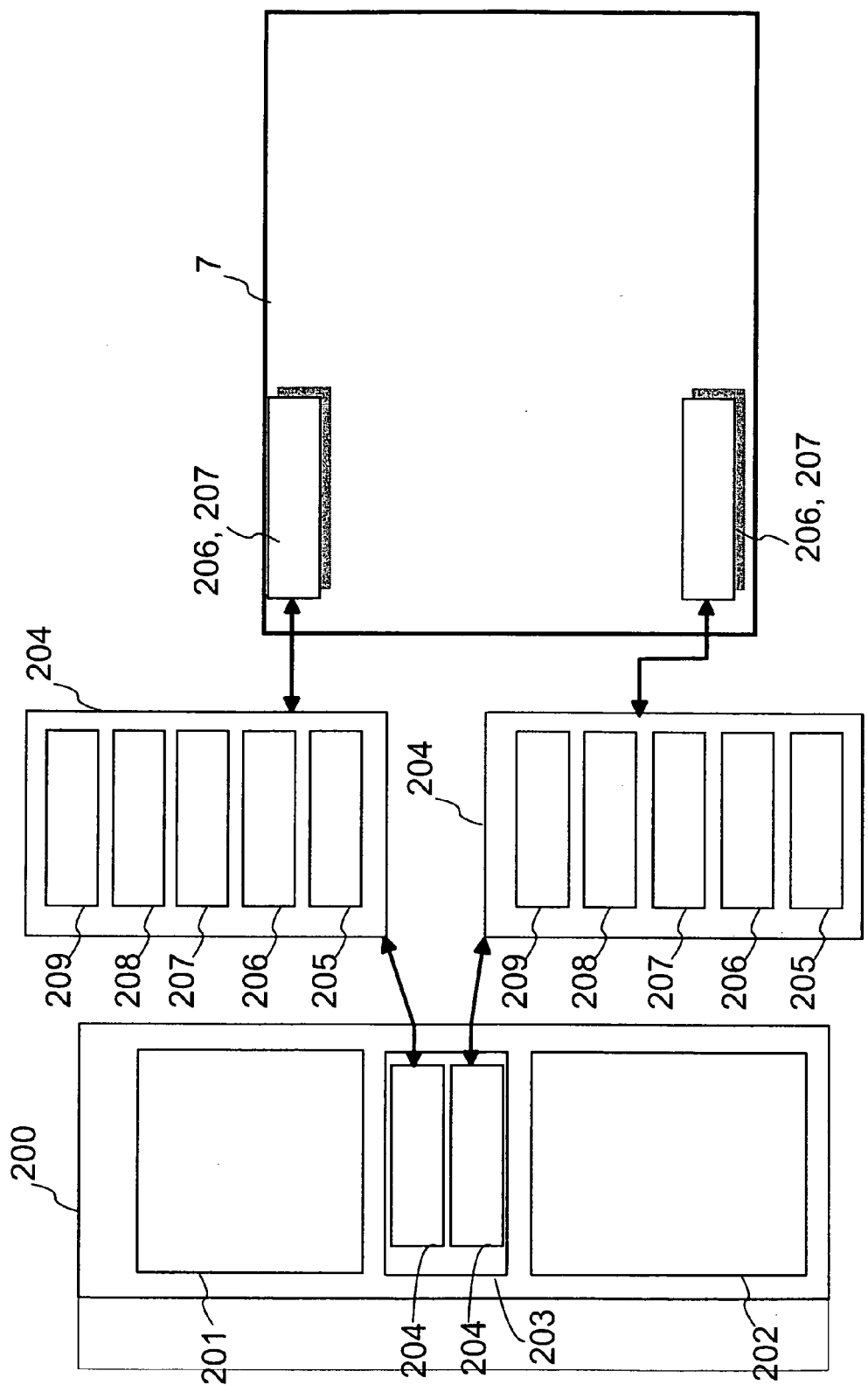
FIG. 2b shows the structure of another image record according to a preferred embodiment of the invention in a simplified manner.
Figure 5:
FIG. 5 shows yet another example of an image in which the invention is applied.

The invention can also be applied in connection with other types of auxiliary data, some examples of which will be given below with reference to FIGS. 2b and 5. FIGS. 2b and 5 show two defining data records 204. These defining data records 204 comprise more than two auxiliary data fields 206, 207. The third auxiliary data field 208 comprises, for example, a telephone number, an e-mail address or the like, as well as data about the application to be started when said auxiliary data is activated. The fourth auxiliary data field 209 may comprise, for example, an audio record, notes, or information to start another measure to be taken for the activation. One example of such an application to be mentioned is the situation of FIG. 5, in which there is a background image 501 and auxiliary data 502, 503 attached to this background image 501 on the display. The first auxiliary data 502 relates, for example, to the sending of e-mail, and the second auxiliary data relates, for example, to making a voice call. Thus, the defining data record (not shown) of the first auxiliary data 502 is provided with a area definition and four auxiliary data fields which define e.g. the following: The location where the auxiliary data is presented, image data of the passive state (no e-mail received/to be sent), image data of the active state (e-mail received or the user wants to send e-mail), information about the e-mail address, and sound to be presented in connection with receiving e-mail. When the user detects, on the basis of a change in the state of the first auxiliary data 502, that e-mail has been received, the user can read it, for example, by pointing at this auxiliary data 502 with a pointer device (not shown) or in another way known as such. E-mail can be sent to a given e-mail address by selecting (activating) this first auxiliary data 502, wherein the device 1 displays the image complying with the second auxiliary data field of the defining data record of the first auxiliary data, as well as starts the e-mail application for writing e-mail. Preferably, an e-mail address stored in the fourth auxiliary data field of the first auxiliary data part 502 is set as the receiver's address.

In the example situation of FIG. 5, the second auxiliary data 503 relates to calls, wherein the defining data record (not shown) of the second auxiliary data 503 comprises, in a corresponding manner, the area definition and four auxiliary data fields, which define e.g. the following: The location where the auxiliary data is to be displayed, the image data of the passive state (no calls incoming/to be made), the image data of the active state (call coming in or the user wants to call), the data of the telephone number, and the sound to be reproduced upon an incoming call. In a corresponding manner, this second auxiliary data 503 can be used when calling a given number.

The present invention is suitable for use particularly in connection with such image formats which have a header part and an image data part of a substantially fixed format, as well as a facility to attach auxiliary data. Thus, such devices in which the function according to the invention is not implemented, can still display the image according to the image data part without the auxiliary data on the display. One nonrestrictive example of such an image format is JPEG, which is used, for example, in several digital cameras. The JPEG image format comprises a header part and an image data part. The header part comprises a fixed element and an optional expansion element, wherein this optional expansion element can be used for storing auxiliary data parts according to the invention. In camera applications, the optional expansion element further comprises data complying with EXIF definitions, which is used to indicate e.g. the way in which JPEG images are stored in the camera, and possible camera-specific additional data.

The invention can be applied in a number of different devices and programs. Examples to be mentioned include cameras, camera phones, combinations of a camera and a communication device, combinations of a camera and a data processor, photo album applications, web browsers, communication devices suitable for receiving and/or sending multimedia messages, printers, etc.

Although the invention has been presented above in connection with single images, the invention can also be applied in connection with series of images, such as video images. In this case, the image data part 202 comprises several images (e.g. single images of a video presentation). In practice, these images are not necessarily stored in one image data part 202 but they may have been divided into several image data parts 202. The auxiliary data to be displayed in connection with such image series may also be information relating to the progression of the image series, such as playing time or image number from the beginning of the image series, remaining playing time or the number of remaining images, etc. The auxiliary data may also be, in connection with music videos, the name of the performer, the name of the piece performed, the lyrics of a song, for example, in applications of the karaoke type, etc. The viewer of the video can thus, at will, switch the auxiliary data (such as the lyrics of the song) on or off the display.

The image series can also be acquired, for example, via the Internet data network. Also in this case, the image series may be provided with auxiliary data which the viewer of the image series can, at will, set to be visible or invisible.

In yet another advantageous application of the invention, the visibility of the auxiliary data can be limited, for example, in such a way that the auxiliary data can only be seen for a charge. In this case, after making a payment, the user is authorized to make the auxiliary data visible.

This can be implemented in a number of ways known as such, for example by means of a password. Thus, the auxiliary data can only be made visible by entering the password. Naturally, the invention is also suitable for situations in which the clearing of the auxiliary data from the display is limited. This is particularly suitable for situations in which the viewer is offered, for example, a video for pre-viewing without a payment, but during the viewing, auxiliary data is displayed on top of the video image. This auxiliary data can be switched off e.g. for a charge. Naturally, the above-presented examples are only nonrestrictive examples illustrating the uses of the invention.

The functions required for applying the present invention can be largely implemented by software, for example, as program codes of the control block 5.

It will be obvious that the present invention is not limited solely to the above-presented embodiments but it can be modified within the scope of the appended claims.

The invention claimed is:

1. A method comprising
   storing an image record on memory of a device in a standard digital recording format wherein, the image record is provided with at least a header part for storing a header, an image data part for storing image data and an auxiliary data part relating to a communication application, said auxiliary data part comprising at least one defining data record including items of auxiliary data comprising at least:
   an area definition that indicates a location for a defined area in the image where displaying of one or more of said items of auxiliary data contained in the defining data record are targeted,
   a first auxiliary data field for storing on the memory of the device image data for the area defined by the area definition for a first displaying situation, and
   a second auxiliary data field for storing on the memory of the device image data for the area defined by the area definition for a second displaying situation, and
   a third auxiliary data field which contains data relating to a communication application, said data being used by the communication application, and
   wherein in connection with image processing of the image data by a processor of the device, the method further comprises:
   providing for user selection of whether said one or more items of auxiliary data are displayed in connection with displaying the image on the display of the device.

2. The method according to claim 1, comprising displaying on the display of the device in a situation, in which the auxiliary data defined by the defining data record is displayed, the image data contained in the first auxiliary data field in the location indicated by the area definition; and displaying on the display of the device the auxiliary data defined by the second auxiliary data field or the third auxiliary data field on top of said image data contained in the first auxiliary data field.

3. The method according to claim 1, comprising displaying on the display of the device in a situation, in which the auxiliary data defined by the defining data record is not displayed, the image data contained in the first auxiliary data field in the location indicated by the area definition.

4. The method according to claim 1, wherein said at least one defining data record further comprises
   a fourth auxiliary data field, which contains audio data intended to be reproduced in connection with the displaying of said at least one item of auxiliary data on the display of the device.

5. The method according to claim 4, wherein the communication application is an e-mail application, wherein said fourth auxiliary data field contains an e-mail address.

6. The method according to claim 4, wherein the communication application is a call application, wherein said fourth auxiliary data field contains a telephone number.

7. The method according to claim 1, wherein the first displaying situation relates to a passive state of the communication application, and the second displaying situation relates to an active state of the communication application.

8. An apparatus comprising:
   a processor; and
   memory including program code, the memory and the program code configured to, with the processor, cause the apparatus at least to:
   store an image record in a standard digital recording format comprising at least a header part for storing a header, an image data part for storing image data and an auxiliary data part relating to a communication application;
   process the image record;
   store at least one defining data record containing auxiliary data in connection with the auxiliary data part of the image record; and
   select at least one item of stored auxiliary data to be displayed, if necessary, in connection with displaying an image wherein said at least one defining data record comprises:
   an area definition that indicates a location for a defined area in the image where displaying of one or more of said items of auxiliary data contained in the defining data record are targeted;
   a first auxiliary data field for storing image data for the area defined by the field definition for a first displaying situation;
   a second auxiliary data field for storing image data for the area defined by the area definition for a second displaying situation; and
   a third auxiliary data field which contains data relating to the communication application wherein said memory and the program code are configured to, with the processor, cause the apparatus to provide for user selection of whether the one or more items of auxiliary data are displayed in connection with displaying the image on a display of the apparatus.

9. The system according to claim 8, configured to display image data contained in the first auxiliary data field, in the location indicated by the area definition, and to place the auxiliary data defined in the second or third auxiliary data field on top of the image data contained in the first auxiliary data field.

10. The apparatus according to claim 8, wherein the first displaying situation relates to a passive state of the communication application, and the second displaying situation relates to an active state of the communication application.

11. A device configured
to store an image record in a standard digital recording format as comprising at least a header part for storing a header of an image, an image data for storing image data part and an auxiliary data part relating to a communication application;
to process the image record;
to store at least one defining data record containing auxiliary data in connection with the auxiliary data part of the image record; and
to select at least one item of stored auxiliary data to be displayed, if necessary, in connection with displaying an image, wherein said at least one defining data record comprises:
an area definition that indicates a location for a defined area in the image where displaying of one or more of said items of auxiliary data contained in the defining data record are targeted;
a first auxiliary data field for storing image data for the area defined by the area definition for a first display situation;
a second auxiliary data field for storing on the memory of the device image data for the area defined by the area definition for a second displaying situation; and
a third auxiliary data field which contains data relating to a communication application, said data being used by the communication application.

12. The device according to claim 11, configured to display image data contained in the first auxiliary data field, in the location indicated by the area definition, and to place the auxiliary data defined in the second auxiliary data field or in the third data field on top of the image data contained in the first auxiliary data field.

13. The device according to claim 11, wherein said at least one defining data record also comprises
a fourth auxiliary data field, which contains audio data intended to be reproduced in connection with the displaying of said at least one auxiliary data.

14. The device according to claim 11, wherein the first displaying situation relates to a passive state of the communication application, and the second displaying situation relates to an active state of the communication application.

15. An image record, in which image data is stored in a standard digital recording format on a non-transitory computer readable medium, and the image record is provided with at least a header part for storing a header, an image data part for storing image data and an auxiliary data part relating to a communication application, said auxiliary data part comprising at least one defining data record containing items of auxiliary data comprising at least:
an area definition that indicates a location for a defined user in the image where displaying of one or more of said items of auxiliary data contained in the defining data record are targeted;
a first auxiliary data field for storing image data for the area defined by the area definition for a first displaying situation;
a second auxiliary data field for storing image data for the area defined by the area definition for a second displaying situation;
a third auxiliary data field which contains data relating to the communication application.

16. The image record according to claim 15, wherein the image data part contains a single image.

17. The image record according to claim 15, wherein the image data part contains a series of images.

18. The image record according to claim 15, wherein the first displaying situation relates to a passive state of the communication application, and the second displaying situation relates to an active state of the communication application.

* * * * *

UNITED STATES PATENT AND TRADEMARK OFFICE
CERTIFICATE OF CORRECTION

PATENT NO. : 8,072,509 B2
APPLICATION NO. : 10/865495
DATED : December 6, 2011
INVENTOR(S) : Petteri Ruotsalainen and Taisto Heinonen It is certified that error appears in the above-identified patent and that said Letters Patent is hereby corrected as shown below:

At column 11, line 10 (claim 11, line 3), delete "as".

At column 11, line 11 (claim 11, line 4), delete "of an image".

Signed and Sealed this
Third Day of April, 2012

David J. Kappos
*Director of the United States Patent and Trademark Office*